United States Patent
Ceder et al.

(10) Patent No.: US 11,784,301 B2
(45) Date of Patent: Oct. 10, 2023

(54) HIGH-CAPACITY LITHIUM METAL OXYFLUORIDES WITH COMBINED METAL AND OXYGEN REDOX FOR LI-ION BATTERY CATHODES

(71) Applicant: THE REGENTS OF THE UNIVERSITY OF CALIFORNIA, Oakland, CA (US)

(72) Inventors: Gerbrand Ceder, Orinda, CA (US); Jinhyuk Lee, Walnut Creek, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 591 days.

(21) Appl. No.: 16/613,731

(22) PCT Filed: Jun. 7, 2018

(86) PCT No.: PCT/US2018/036517
§ 371 (c)(1),
(2) Date: Nov. 14, 2019

(87) PCT Pub. No.: WO2018/231630
PCT Pub. Date: Dec. 20, 2018

(65) Prior Publication Data
US 2020/0099042 A1     Mar. 26, 2020

Related U.S. Application Data

(60) Provisional application No. 62/518,453, filed on Jun. 12, 2017.

(51) Int. Cl.
*H01M 4/13* (2010.01)
*H01M 4/48* (2010.01)
(Continued)

(52) U.S. Cl.
CPC ........ *H01M 4/1315* (2013.01); *H01M 4/485* (2013.01); *H01M 4/505* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| | | |
|---|---|---|
| 5,674,645 A | 10/1997 | Amatucci et al. |
| 2010/0183925 A1 | 7/2010 | Manthiram et al. |

(Continued)

FOREIGN PATENT DOCUMENTS

| | | |
|---|---|---|
| EP | 2921455 A1 | 9/2015 |
| WO | 2017047016 A | 3/2017 |

OTHER PUBLICATIONS

Lee, J. et al., "Reversible Mn2+double redox in lithium-excess cathode materials," Nature, 556:7700, Apr. 2018.

(Continued)

*Primary Examiner* — Maria Laios
*Assistant Examiner* — Angela J Martin
(74) *Attorney, Agent, or Firm* — Miller Nash LLP

(57) ABSTRACT

A lithium metal oxide suitable for use as a cathode material in a rechargeable battery having a general formula of: $Li_xM_zM'_zO_uF_y$, where x is $1.80<x<2.20$, $y=1$, and more specifically $1.90<x<2.10$, with $1.80<u<2.20$. Preferably, $1.90<u<2.10$, and $0.80<y<1.20$, or more specifically, $0.90<y<1.10$. The lithium metal oxide has a cation-disordered rocksalt structure, wherein M is a transition metal selected from a first group consisting of Ni, Mn, Co, Fe, and combinations thereof. M' is a transition metal selected from a second group consisting of Ti, Zr, Nb, Mo, Sn, Hf, Te, Sb, and combinations thereof. M has a first oxidation state q and (Continued)

M' has a second oxidation state q', with $(q/z)+(q'/z')=+3$, preferably $+2.7 \leq q/z)+(q'/z') \leq +3.3$.

14 Claims, 7 Drawing Sheets

(51) Int. Cl.
    *H01M 4/50*         (2010.01)
    *H01M 10/05*       (2010.01)
    *H01M 4/1315*     (2010.01)
    *H01M 4/485*      (2010.01)
    *H01M 4/505*      (2010.01)
    *H01M 10/0525*    (2010.01)
    *H01M 4/02*       (2006.01)

(56) References Cited

U.S. PATENT DOCUMENTS

2013/0022872 A1    1/2013   Noh et al.
2018/0090745 A1*   3/2018   Asano ................ H01M 10/052
2018/0090790 A1*   3/2018   Nakatsutsumi ... H01M 10/0568

OTHER PUBLICATIONS

International Search Report and Written Opinion, PCT/US2018/036517, dated Sep. 10, 2018, 9 pages.

Barpanda, et al. "A 3.90 V iron-based fluorosulphate material for lithium-ion batteries crystallizing in the triplite structure," Nature Materials, vol. 10, Aug. 21, 2011, pp. 772-779.
Chen et al., "Disordered Lithium-Rich Oxyfluoride as a Stable Host for Enhanced Li+ Intercalation Storage," Advanced Energy Materials, vol. 5, 2015, 1401814, 7 pages.
Kang and Ceder, "Battery materials for ultrafast charging and discharging," Nature, vol. 458, Mar. 12, 2009, pp. 190-193.
Kang et al., "Electrodes with High Power and High Capacity for Rechargeable Lithium Batteries," Science, vol. 311, Feb. 17, 2006, pp. 977-980.
Lee et al., "Unlocking the Potential of Cation-Disordered Oxides for Rechargeable Lithium Batteries," Science, vol. 343, Jan. 31, 2014, pp. 519-0522.
Ren et al., "Improved Voltage and Cycling for Li+ Intercalation in High-Capacity Disordered Oxyfluoride Cathodes," Advanced Science, vol. 2, 2015, 1500128, 6 pages.
Seo et al., "The structural and chemical origin of the oxygen redox activity in layered and cation-disordered Li-excess cathode materials," Nature Chemistry, vol. 8, Jul. 2016, pp. 692-697.
Tarascon and Armand, "Issues and challenges facing rechargeable lithium batteries," Nature, vol. 414, Nov. 15, 2001, pp. 359-367.
Yabuuchi, et al., "High-capacity electrode materials for rechargeable lithium batteries: Li3NbO4-based system with cation-disordered rocksalt structure," PNAS Early Edition, 150490112, 6 pages.

* cited by examiner

HIGH-CAPACITY LITHIUM METAL OXYFLUORIDES WITH COMBINED METAL AND OXYGEN REDOX FOR LI-ION BATTERY CATHODES

CROSS-REFERENCE TO RELATED APPLICATIONS

This application is a 371 of International Application No. PCT/US2018/036517, filed Jun. 7, 2018, which claims priority to and the benefit of U.S. Provisional Application No. 62/518,453 filed Jun. 12, 2017, the contents of both of which are incorporated by reference herein in their entirety.

BACKGROUND

High performance batteries generally have high energy density. Energy density typically indicates the amount of energy stored in a given system or region of space per unit volume. Rechargeable lithium-ion, Li-ion, batteries consist of a negative electrode and a positive electrode between which lithium ions move during discharge and recharge. Typically, they use an intercalated lithium compound as one electrode material, as opposed to the metallic lithium used in non-rechargeable lithium battery cells. See WO2015140264A1, "Oxyfluoride Compounds for Lithium-cells and Batteries," filed Mar. 19, 2015, with a priority date of Mar. 20, 2014.

With ever increasing demand for high-performance Li-ion batteries, several different cathode materials with high energy density and a low cost have been sought from several different chemical systems. (See for example, B. Kang, G. Ceder, Nature 458, 190-193 (2009); P. Barpanda, M. Ati, B. C. Melot, G. Rousse, J-N. Chotard, M-L. Double, M. T. Sougrati, S. A. Corr, J-C. Jumas, J-M. Tarascon, *Nature materials* 10, 772-779 (2011); and K. Kang, Y. S. Meng, J. Breger, C. P. Grey, G. Ceder, *Science* 311, 977-980 (2006).

Recently, it was demonstrated that disordered rocksalt-type lithium metal oxyfluorides ($Li_2MO_2F$, M=V, Cr) can deliver high capacity above 300 mAh/g, showing their potential as high performance cathode materials. (See, for example, R. Chen, S. Ren, M Knapp, D. Wang, R Witter, M. Fichtner, H. Hahn, *Adv. Energy Mater.* 5, 1401814 (2015); S. Ren, R. Chen, E. Maawad, O. Dolotko, A. A. Guda, V. Shapovalov, D. Wang, H. Hahn, M. Fichtner, *Adv. Sci.* 2, 1500128 (2015); and R. Chen, S. Ren, S. Indris, M. Fichtner, H. Hahn, EP2921455 A1, Patent Application (2015 Sep. 24).)

In rocksalt materials, lithium and metal atoms are randomly distributed with an FCC (face-centered cubic) anion lattice made of oxygen and fluorine atoms to form a disordered rocksalt structure. The high lithium content in the structure having a lithium to metal ratio of 2:1 (Li:M=2:1) allows for facile macroscopic lithium diffusion through a percolating network of lithium diffusion channels.

In addition, as shown in the above references, metal species have been sought from either $V^{3+}$ or $Cr^{3+}$, and possibly to include $Mo^{3+}$ or $W^{3+}$, whose multiple redox couples (e.g., $V^{3+}/V^{4+}$ $N^{5+}$, $Cr^{3+}/Cr^{4+}/Cr^{5+}$, $Mo^{3+}/Mo^{4+}/Mo^{5+}$) can compensate for all the charge capacity necessary to extract lithium ions with the following reaction:

$$Li_2MO_2F[M^{3+}]=>2Li++2e^-+MO_2F[M^{5+}].$$

Unfortunately, previously proposed metal species with multiple redox couples tend to generate a low voltage of less than 3 volts. Therefore, currently available disordered rocksalt $Li_2MO_2F$ compounds, such as $Li_2VO_2F$, operate at low voltages and deliver a low average discharge voltage of less than 2.8 V, making the compounds not attractive in a practical battery cell. Moreover, the previously assumed condition that the metal species, M, in $Li_2MO_2F$ need to be in their $M^{3+}$ (e.g., $V^{3+}$, $Cr^{3+}$) states significantly limits the search space of high capacity cathode materials.

DETAILED DESCRIPTION OF THE EMBODIMENTS

Figure 1A:
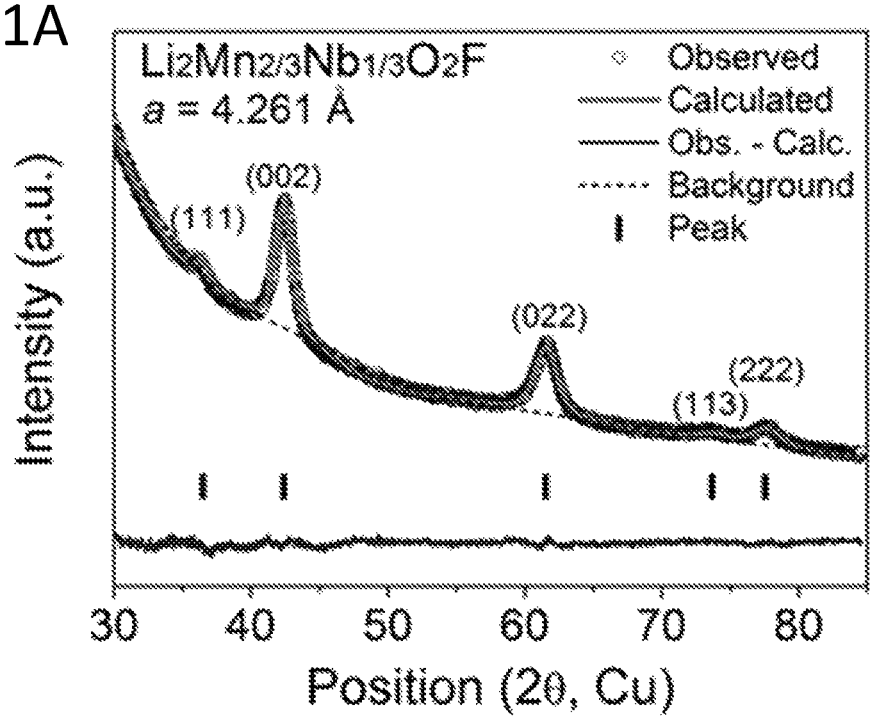
FIG. 1a-1b show an x-ray diffraction patterns and refinement results of some embodiments.

The embodiments here disclose a lithium metal oxide suitable for use as a cathode material in a rechargeable battery. The lithium metal oxide has a general formula of: $Li_xM_zM'_zO_uF_y$, where x is 1.80≤x≤2.20, y=1, and more specifically 1.90≤x≤2.10, with 1.80≤u≤2.20. Preferably, 1.90≤u≤2.10, and 0.80≤y≤1.20, or more specifically, 0.90≤y≤1.10. The lithium metal oxide has a cation-disordered rocksalt structure, wherein M is a transition metal selected from a first group consisting of Ni, Mn, Co, Fe, and combinations thereof. M' is a transition metal selected from a second group consisting of Ti, Zr, Nb, Mo, Sn, Hf, Te, Sb, and combinations thereof. M has a first oxidation state q and M' has a second oxidation state q', with (q/z)+(q'/z')=+3, preferably +2.7≤q/z)+(q'/z')≤+3.3.

By making the oxyfluoride compounds with redox-active metal species (e.g., Ni, Co, Mn, Fe) that leads to high voltage and with high-valent charge balancing metal species (e.g., Ti, Zr, Nb), we can increase the average voltage of the compounds by using not only the metal redox but also the oxygen redox. Thereby, improved energy density can be obtained.

The embodiments here show new disordered rocksalt-type lithium metal oxyfluorides that deliver high capacity at a high average voltage above, leading to exceptionally high energy densities. In one embodiment, the high capacity is greater than 300 milliamps per gram (mA/g). One embodiment has a high average voltage above 3 volts. The same embodiment, or another, has an energy density above 1000 Wh/kg (Watt-hour/kg). The embodiments here achieve this by utilizing not only conventional metal redox but also oxygen redox processes that are known to give a high voltage. In addition, the embodiments here do not require metals to be in their 3+ states. Therefore, many different compounds with varying compositions can be developed and tested.

Optionally, M is a transition metal selected from a first group consisting of Mn, Co, Fe, and combinations thereof.

Preferably, M' is a transition metal selected from a second group consisting of Ti, Zr, Nb, Mo, Hf, Te, Sb, and combinations thereof Optionally, the lithium metal oxides discussed above have a cation-disordered rocksalt structure characterized by a crystallographic space group Fm-3m. Further in the lithium metal structure above, including those with the cation-disordered rocksalt structures may have M as Mn. In any of the above embodiments, M' may be Ti or Nb. In the embodiments where M' is either Ti or Nb, the formula may be $Li_2Mn_{1/2}Ti_{1/2}O_2F$ or $Li_2Mn_{2/3}Nb_{1/3}O_2F$. A specific embodiment includes a lithium metal oxide suitable for use as a cathode material in a rechargeable battery. The lithium metal oxide has a general formula of $Li_xM_zM'_{z'}O_uF_y$, with $1.80 \le x \le 2.20$, including $1.90 \le y \le 2.10$, and $1.80 \le u \le 2.20$. Another embodiment has $1.90 \le u \le 2.10$, and with $0.80 \le y \le 1.20$, or more specifically $0.90 \le y \le 1.10$. The lithium metal oxide has a cation-disordered rocksalt structure, wherein M' is Ti or Nb; wherein M has a first oxidation state q and M' has a second oxidation state q', with $(q/z)+(q'/z')=+3$, preferably $+2.7 \le q/z)+(q'/z') \le +3.3$.

In any of the above embodiments, the molar ratio between lithium and the transition metal is $x/(z+z')=2.00\pm0.20$, and a more specific embodiment where $x/(z+z')=2.00\pm0.10$. In any of the above embodiments, the molar ratio between F and the oxygen is $0.50\pm0.10$. In this description, to aid in the understanding of embodiments, the discussion shows results of two particular materials, $Li_2Mn_{2/3}Nb_{1/3}O_2F$ and $Li_2Mn_{1/2}Ti_{1/2}O_2F$. These materials are new and would not result from previous assumptions that the metal species must be at their 3+ states. As in the single metal lithium compounds discussed above, the ratio of lithium to metal, where the metal consists of two metals in a compound, is 2:1.

Variations of the ratios exist, including the lithium and the combination of metals having a ratio of 1:1 with a possible deviation of 10% due to off-stoichiometry; a ratio of 2:1 with a possible deviation of 10% due to off-stoichiometry; and a ratio of 3:1 with a possible deviation of 10% due to off-stoichiometry. Similar variations in the ratios of oxygen and fluorine exist, including the oxygen and fluorine having a ratio of 2:1 with a possible deviation of 10% due to off-stoichiometry; the lithium and the combination of metals having a ratio of 1:1 and the oxygen and fluorine having a ratio of 2:1, with a possible deviation of 10% due to off-stoichiometry.

Further, the composition of matter may have a theoretical metal-redox capacity less than the lithium capacity. In this regard, the theoretical capacity is less than the capacity expected by the Li content in a compound. Here, the Li capacity refers to the capacity based on the Li content in a compound, without consideration of redox reservoir amount. In other variations, the composition may result from a method to incorporate fluorine by simultaneously introducing cation disorder, or from ball milling to incorporate fluorine by simultaneously introducing cation disorder.

The theoretical metal-redox capacity is defined as the unit charge per mass of an active material (mAh/g of an active material), stored by metals in the compound exchanging electrons through their oxidation-state change upon lithium extraction/insertion. The lithium capacity is defined as the unit charge per mass of an active material (mAh/g of an active material), based on full extraction of lithium in the compound with one electron being removed per one lithium. If the lithium capacity is higher than the theoretical metal-redox capacity, oxygen in a compound can also exchange electrons through their oxidation-state change to give additional redox capacity. This phenomenon is called oxygen redox.

In general, fluorine substitution for oxygen is difficult to achieved within a cation-ordered close-packed oxide structure. In our compounds, fluorine incorporation is promoted because our synthesis method leads to in the cation-disordered rocksalt phase whose random cation-distribution facilitates the fluorine uptake.

In general, the process involves using precursors in a room or low-temperature mechanical process to form the compounds mechanochemically. Stochiometric amounts of the precursors were used, except for lithium oxide. To compensate for possible loss of lithium oxide during synthesis, the process used an excess amount of lithium oxide.

In particular, the present invention provides a process according to claim 15.

The invention is also inclusive of a positive electrode material comprising a lithium metal oxide of any claims 1 to 15.

The invention also covers a battery, in particular a Li-ion battery comprising a negative electrode material, an electrolyte and a positive electrode material according to claim 15.

Example 1

The process used the following materials as precursors:
$Li_2O$, (Alfa Aesar, ACS, 99% min),
MnO (Alfa Aesar, 99%),
$Nb_2O_5$ (Alfa Aesar, 99.9%),
LiF (Alfa Aesar, 99.99%).
Stochiometric amounts of the precursors except for $Li_2O$, and a 10% excess amount of $Li_2O$ were dispersed into stainless steel jars. A 10% excess amount means 10% more than what one would need to acquire the desired compound without any lithium loss. The precursors are then planetary ball-milled for 40 hours at the rate of 450 rpm, during which $Li_2Mn_{2/3}Nb_{1/3}O_2F$ forms mechanochemically.

Phase identification was conducted using X-ray diffraction (XRD) collected on a Rigaku MiniFlex diffractoreter with a copper source in the 2θ range of 5-85°. Rietveld refinement was completed with using PANalytical X'pert HighScore Plus software.

Example 2

This example uses the same process but the following materials are used as precursors:
$Li_2O$, (Alfa Aesar, ACS, 99% min),
MnO (Alfa Aesar, 99%),
$TiO_2$ (Alfa Aesar, 99.9%),
LiF (Alfa Aesar, 99.99%).
These precursors are then planetary ball-milled for 40 hours at a rate of 450 rpm, during which $Li_2Mn_{1/2}Ti_{1/2}O_2F$ forms mechanochemically.

Example 3 To prepare a cathode film from $Li_2Mn_{1/2}Ti_{1/2}O_2F$ or $Li_2Mn_{2/3}Nb_{1/3}O_2F$, the powder of active compounds and carbon black (Timcal, SUPER C65) were first shaker milled for one hour with SPEX 8000M Mixer/Mill with the weight ratio of 6:3. Then, polytetrafluoroethylene (PTFE, DuPont, Teflon 8C) was later added to the mixture as a binder, such that the cathode film consists of the active compounds, carbon black, and PTFE in the weight ratio of 60:30:10.

The components were then manually mixed using a pestle and a mortar and rolled into a thin film inside an argon-filled glove box. To assemble a cell for all cycling test, except for in situ X-ray diffraction, 1 M of $LiPF_6$ in ethylene carbonate (EC) and dimethyl carbonate (DMC) solution (1:1, BASF), lass microfiber filters (Whatman), and Li metal foil (FMC) were used as the electrolyte, the separator, and the counter electrode, respectively. Coin cells (CR2032) were assembled in an argon-filled glove box and tested on a Maccor 2200 or an Arbin battery cycler at room temperature in the galvanostatic mode otherwise specified. The loading density of the cathode film was 7 mg cm$^{-2}$. The specific capacity was calculated on the amount of the active compounds (60 wt %) in the cathode film.

Results

Figure 1B:
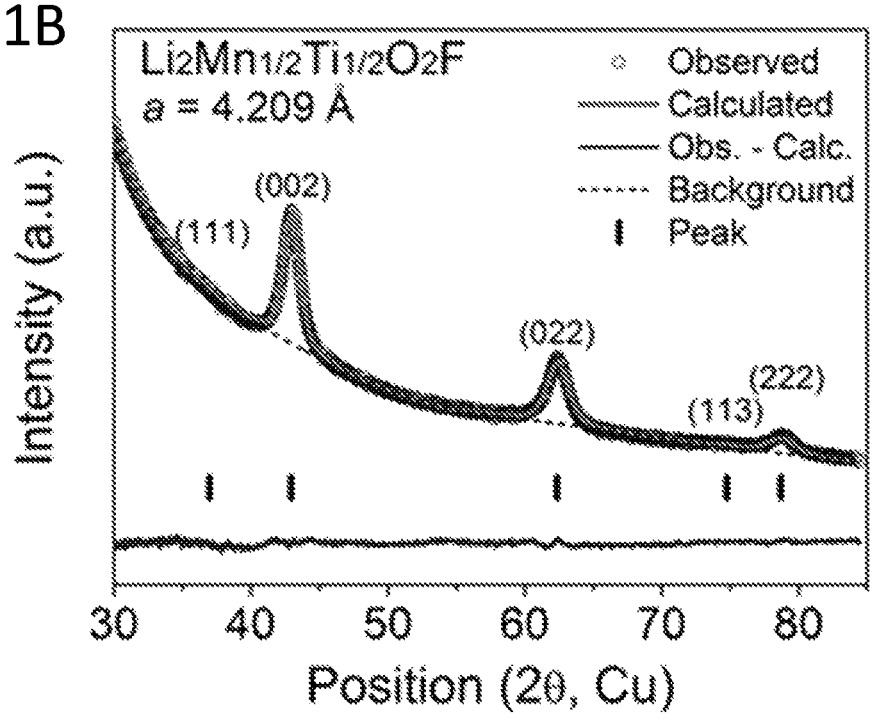
Figures 2A, 2B:
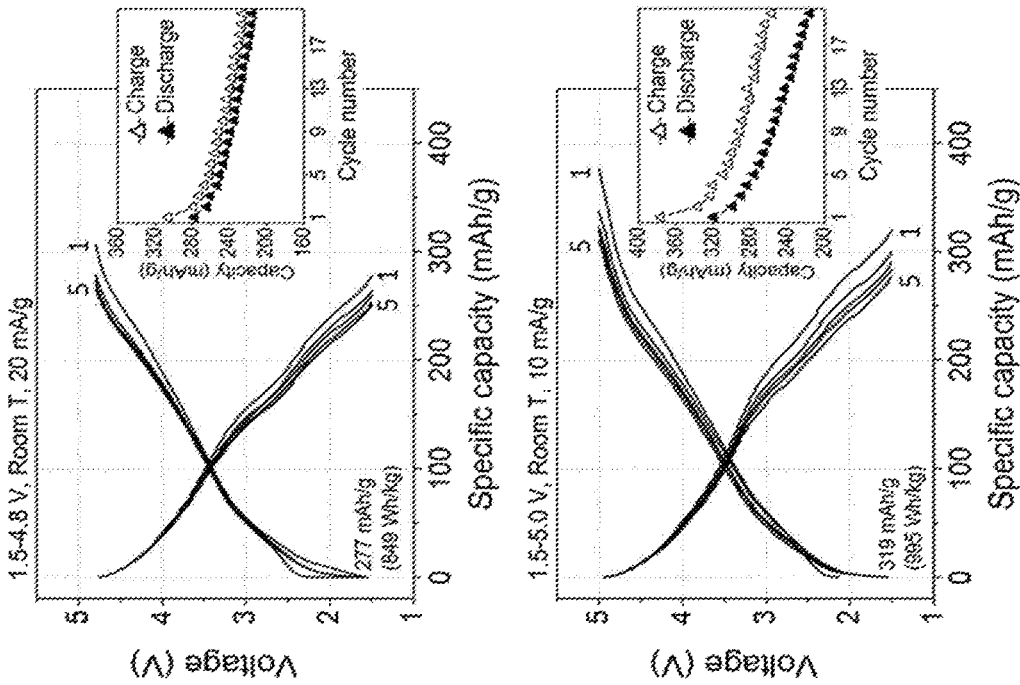
FIGS. 2a-2d show initial five-cycle voltage profiles of some embodiments.
Figures 2C, 2D:
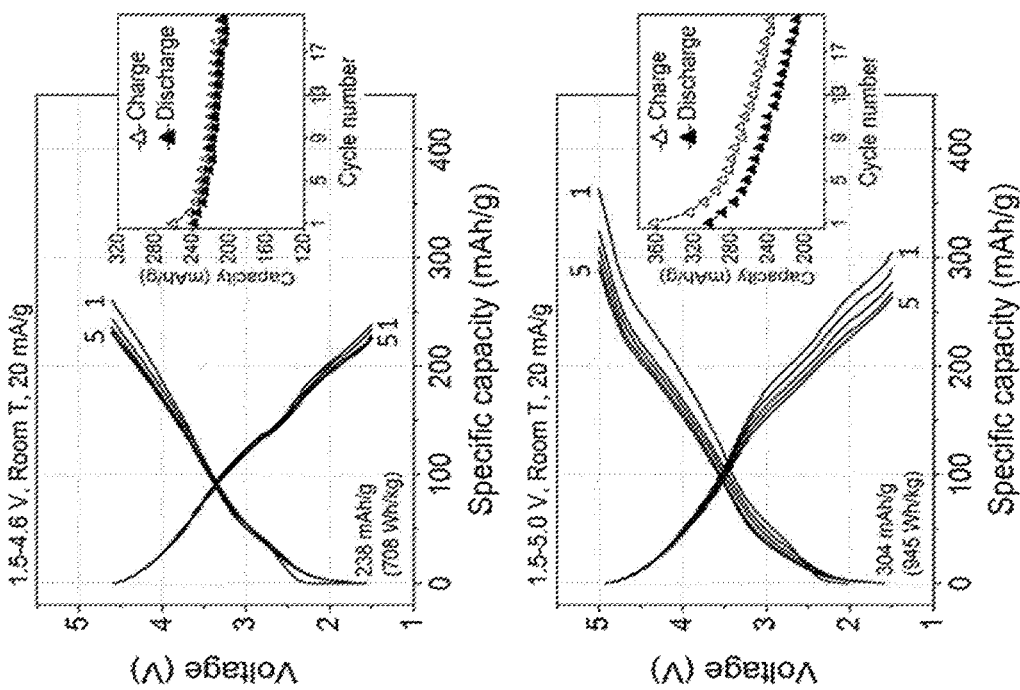

The XRD patterns in FIGS. 1a and 1b indicate that both $Li_2Mn_{2/3}Nb_{1/3}O_2F$ and $Li_2Mn_{1/2}Ti_{1/2}O_2F$ form into disordered rocksalt structures of the space group Fm-3m. XRD refinement on the patterns can be performed with the target compositions of $Li_2Mn_{2/3}Nb_{1/3}O_2F$ and $Li_2Mn_{1/2}Ti_{1/2}O_2F$. The (a-) lattice parameter was found to be 4.261 Å and 4.209 Å for $Li_2Mn_{2/3}Nb_{1/3}O_2F$ and $Li_2Mn_{1/2}Ti_{1/2}O_2F$, respectively.

To test their electrochemical performance, the devices underwent galvanostatic cycling tests. FIGS. 2a to 2d show the initial five-cycle voltage profiles of $Li_2Mn_{2/3}Nb_{1/3}O_2F$ when it is cycled at room temperature between (a) 1.5-4.6 V at 20 mA/g, (b) 1.5-4.8 V at 20 mA/g, (c) 1.5-5.0 V at 20 mA/g, and (d) 1.5-5.0 V at 10 mA/g.

When cycled between 1.5-4.6 V at 20 mA/g, $Li_2Mn_{2/3}Nb_{1/3}O_2F$ delivers reversible capacity up to 238 mAh/g at an average discharge voltage of 3 V, leading to a discharge energy density of up to 708 Wh/kg (2683 Wh/l).

When cycled between 1.5-4.8 V at 20 mA/g, it delivers reversible capacity up to 277 mAh/g at an average discharge voltage of 3.06 V, leading to a discharge energy density up to 849 Wh/kg (3220 Wh/l).

When cycled between 1.5-5.0 V at 20 mA/g (10 mA/g), it delivers reversible capacity up to 304 mAh/g (319 mAh/g) at an average discharge voltage of 3.06 V, leading to a discharge energy density up to ~4000 Wh/kg (3770 Wh/l).

Such a high energy density of 1000 Wh/kg is extremely rarely achieved by Li-ion cathode materials and are among the highest values ever achieved by Li-ion battery research society. Note that such a high energy density could be achieved only because the material delivers a high capacity (>300 mAh/g) and a high average discharge voltage (>3 V) at the same time. Previously reported disordered rocksalt lithium metal oxyfluorides could deliver high capacity only at a low average discharge voltage below 3 V. Note that while the average discharge voltage is ~3.1 V, the average voltage [=(average charge voltage+average discharge voltage)÷2] of $Li_2Mn_{2/3}Nb_{1/3}O_2F$ is in fact as high as ~3.5 V. This indicates that further improvement of the material by removing polarization may further improve the average discharge voltage.

$Li_2Mn_{2/3}Nb_{1/3}O_2F$ can be charged to 375 mAh/g and can reversibly cycle over 300 mAh/g, which exceeds its theoretical $Mn^{2+}/Mn^{4+}$ redox capacity (270 mAh/g). Expectations are that not only manganese redox but also oxygen redox is reversibly taking place in the material to give extra capacities, which would also lead to high voltage.

Figure 3:
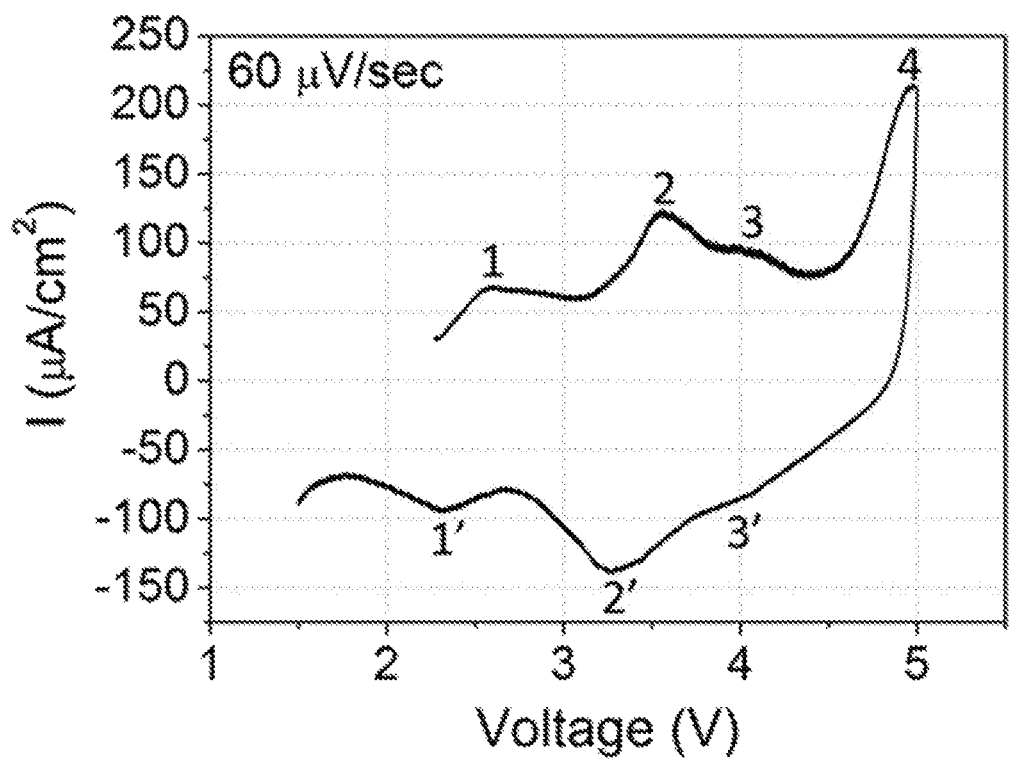
FIG. 3 shows a first-cycle cyclic voltammetry profile of an embodiment.

To estimate potentials at which the redox processes occur, the process performed cyclic voltammetry (CV) tests on $Li_2Mn_{2/3}Nb_{1/3}O_2F$ as shown in FIG. 3. From the anodic sweep corresponding to charge of a cell to 5.0 V, approximately four peaks at ~2.6 V, ~3.6 V, ~4.1 V, and 4.9 V were observed. From the cathodic sweep, which corresponds to discharge of a cell, approximately three peaks at ~2.3 V, ~3.3 V, and ~4.0 V were observed. Combining the anodic and cathodic peaks, one can see that there are redox processes at ~2.45 V, ~3.45 V, ~4.05 V, and likely one another between 4.1 V to 4.9 V, although the 4.9 V peak during anodic sweep is not clearly observed during cathodic sweep.

Since most of the redox processes occur at high voltages above 3 V, average voltage of $Li_2Mn_{2/3}Nb_{1/3}O_2F$ can be above 3 V. This makes it more attractive than the previously reported lithium metal oxyfluorides that delivers capacity at lower voltages (<3 V). It is understood that the $Mn^{2+}/Mn^{4+}$ redox process occurs before oxygen redox in rocksalt-type oxide materials. In addition, theoretical $Mn^{2+}/Mn^{4+}$ redox capacity of $Li_2Mn_{2/3}Nb_{1/3}O_2F$ is 270 mAh/g, which is delivered below 4.5 V during galvanostatic cycling. Therefore, it is most likely that $Mn^{2+}/Mn^{4+}$ oxidation processes are responsible for the anodic peaks at ~2.6 V, ~3.6 V, ~4.1 V, and that oxygen redox occurs above 4.5 V, most extensively at ~4.9 V.

Figure 4:
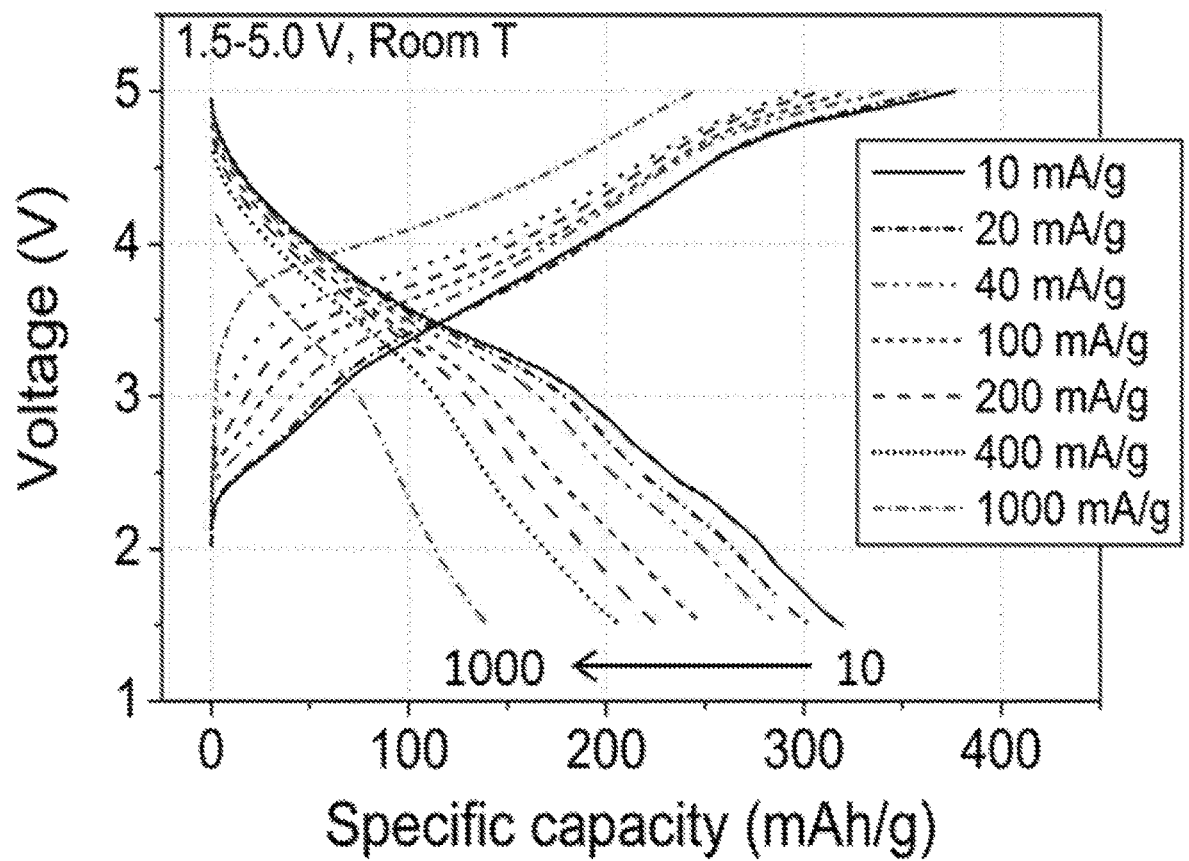
FIG. 4 shows a first-cycle voltage profile for different rates for an embodiment.

The rate capability of $Li_2Mn_{2/3}Nb_{1/3}O_2F$ is also a positive result. FIG. 4 overlays the first-cycle voltage profiles of $Li_2Mn_{2/3}Nb_{1/3}O_2F$ when it is cycled between 1.5-5.0 V at room temperature at rates of 10, 20, 40, 100, 200, 400, and 1000 mA/g. As the rate increases from 10 mA/g to 20, 40, 100, 200, 400, and 1000 mA/g, the discharge capacity (energy density) of $Li_2Mn_{2/3}Nb_{1/3}O_2F$ decreases from 319 mAh/g (995 Wh/kg) to 304 mAh/g (945 Wh/kg), 288 mAh/g (889 Wh/kg), 250 mAh/g (767 Wh/kg), 226 mAh/g (695 Wh/kg), 207 mAh/g (625 Wh/kg), 140 mAh/g (410 Wh/kg), respectively. It is impressive that discharge energy density close to 900 Wh/kg can be achieved at a moderately high rate of 100 mA/g and that the material can still deliver energy density of 410 Wh/kg at an extremely high rate of 1000 mA/g. This shows that $Li_2Mn_{2/3}Nb_{1/3}O_2F$ can become a highly promising cathode material for lithium ion batteries.

Figure 5A:
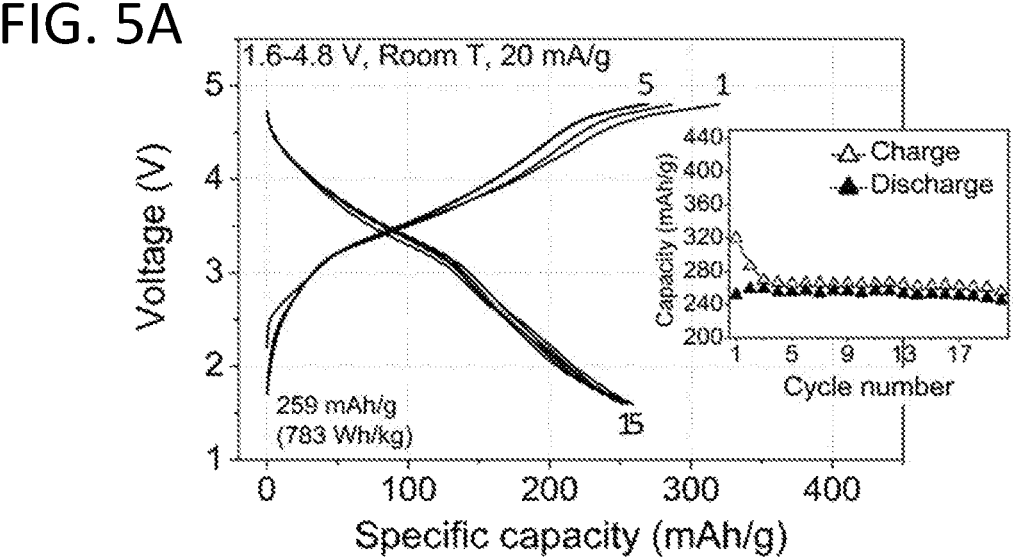
FIGS. 5a-5c show initial five-cycle voltage profiles of an embodiment.
Figure 5B:
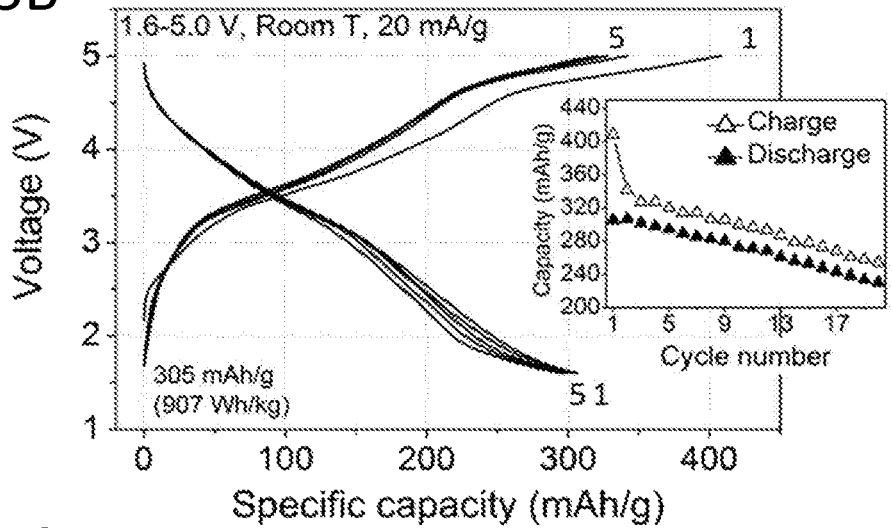
Figure 5C:
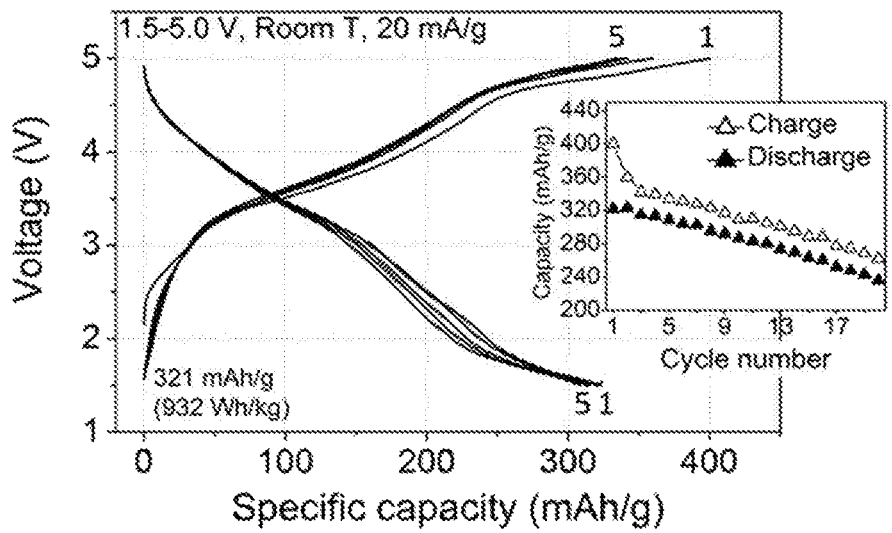

Not only $Li_2Mn_{2/3}Nb_{1/3}O_2F$ but also $Li_2Mn_{1/2}Ti_{1/2}O_2F$ show promising battery performance. FIGS. 5a to 5c show the initial five-cycle voltage profiles of $Li_2Mn_{1/2}Ti_{1/2}O_2F$ when it is cycled at room temperature between (a) 1.6-4.8 V at 20 mA/g, (b) 1.6-5.0 V at 20 mA/g, and (c) 1.5-5.0 V at 20 mA/g.

When cycled between 1.6-4.8 V at 20 mA/g, $Li_2Mn_{1/2}Ti_{1/2}O_2F$ delivers reversible capacity up to 259 mAh/g at an average discharge voltage of 3.03 V, leading to a discharge energy density of up to 783 Wh/kg (2693 Wh/l).

When cycled between 1.6-5.0 V at 20 mA/g, it delivers reversible capacity up to 305 mAh/g at an average discharge voltage of 2.98 V, leading to a discharge energy density up to 907 Wh/kg (3120 Wh/l).

When cycled between 1.5-5.0 V at 20 mA/g, it delivers reversible capacity up to 321 mAh/g (932 Wh/kg). Therefore, one can see that $Li_2Mn_{2/3}Ti_{1/3}O_2F$ also delivers very capacities (>300 mAh/g) and energy densities higher than 900 Wh/kg.

Figure 6:
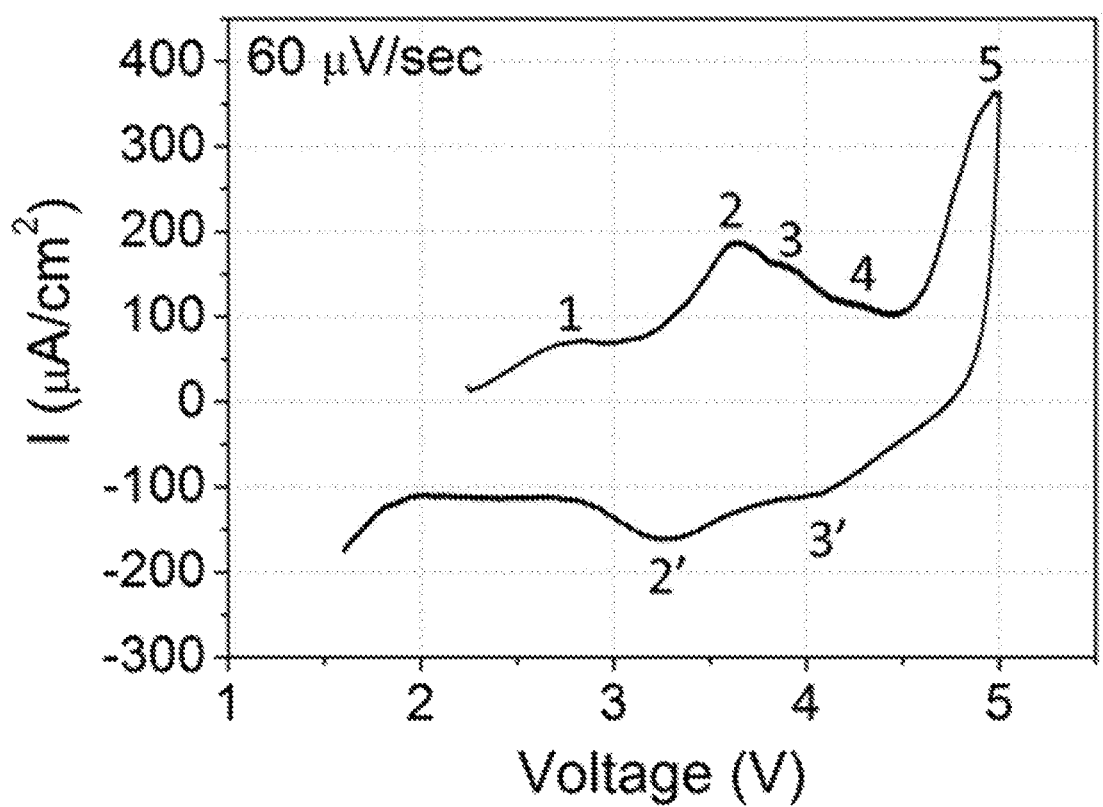
FIG. 6 shows a first-cycle cyclic voltammetry profile of an embodiment.

Cyclic voltammetry on $Li_2Mn_{1/2}Ti_{1/2}O_2F$ suggests similar anodic and cathodic processes as in $Li_2Mn_{2/3}Nb_{1/3}O_2F$ as shown in FIG. 6. Approximately five anodic peaks at ~2.8 V, ~3.6 V, ~3.9 V, ~4.1 V, and 4.9 V and two cathodic peaks at ~3.3 V, and ~4.0 V were observed. The observed anodic and cathodic peaks are at similar voltage as for $Li_2Mn_{2/3}Nb_{1/3}O_2F$, while the cathodic peaks are less clearly defined than those observed for $Li_2Mn_{2/3}Nb_{1/3}O_2F$. Nevertheless, from the similarity of CV profile between the two materials and from the observed reversible capacity (>300 mAh/g) upon galvanostatic cycling exceeding the theoretical $Mn^{2+}/Mn^{4+}$ capacity (240 mAh/g) of $Li_2Mn_{1/2}Ti_{1/2}O_2F$ as shown in FIG. 5, one can expect that $Li_2Mn_{1/2}Ti_{1/2}O_2F$ also utilizes combined manganese redox (<4.5 V) and oxygen redox processes (>4.5 V) as $Li_2Mn_{2/3}Nb_{1/3}O_2F$.

Figure 7:
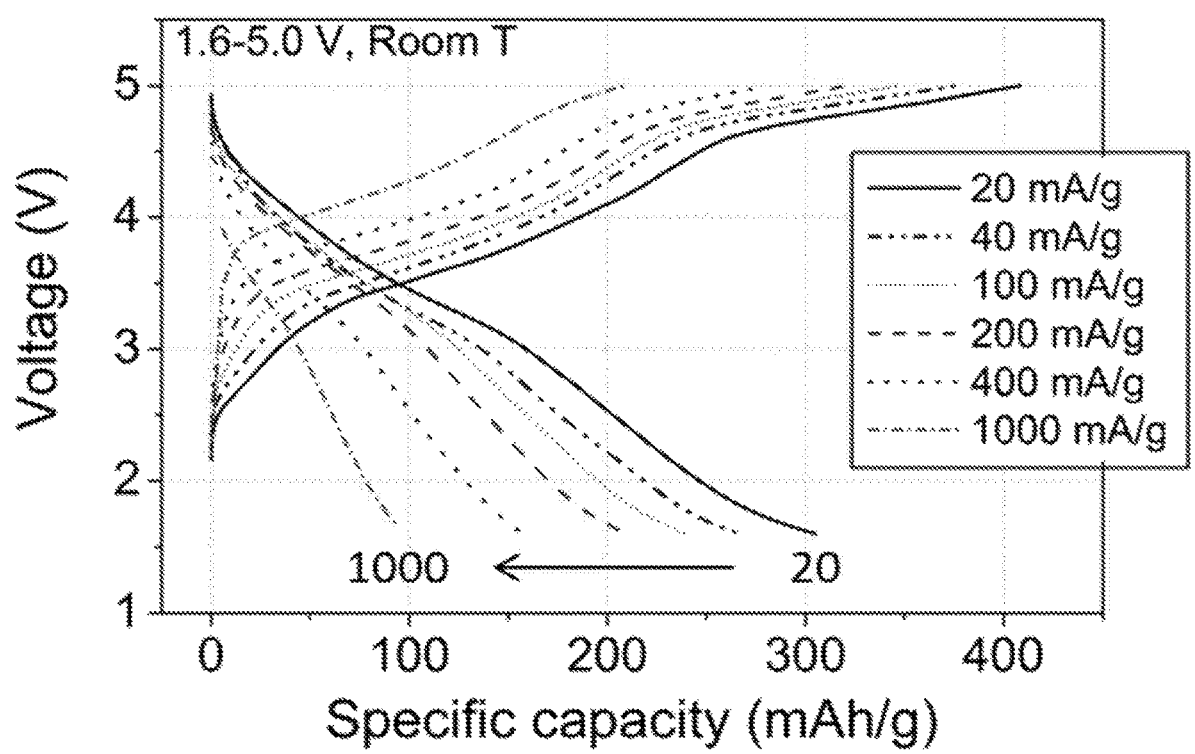
FIG. 7 shows a first-cycle voltage profile for different rates for an embodiment.

$Li_2Mn_{1/2}Ti_{1/2}O_2F$ also has a decent rate capability. FIG. 7 overlays the first-cycle voltage profiles of $Li_2Mn_{1/2}Ti_{1/2}O_2F$ when it is cycled between 1.5-4.6 V at room temperature at rates of 20, 40, 100, 200, 400, and 1000 mA/g. As the rate increases from 20 mA/g to 40, 100, 200, 400, and 1000 mA/g, the discharge capacity or energy density of $Li_2Mn_{2/3}Nb_{1/3}O_2F$ decreases from 321 mAh/g (932 Wh/kg) to 268 mAh/g (791 Wh/kg), 240 mAh/g (717 Wh/kg), 210 mAh/g (629 Wh/kg), 159 mAh/g (461 Wh/kg), 98 mAh/g (254 Wh/kg), respectively. It is also impressive that discharge energy density close to 630 Wh/kg can be achieved at a high rate of 200 mA/g. This shows that $Li_2Mn_{1/2}Ti_{1/2}O_2F$ can become a highly promising cathode material for lithium ion batteries as $Li_2Mn_{2/3}Nb_{1/3}O_2F$.

The results of disordered $Li_2Mn_{2/3}Nb_{1/3}O_2F$ and $Li_2Mn_{1/2}Ti_{1/2}O_2F$ clearly show the benefits of utilizing both metal and oxygen redox processes in disordered lithium metal oxyfluoride materials. Previously, the focus of the research on disordered lithium metal oxyfluorides was on choosing metal species that are in their 3+ states and can be oxidized to 5+ upon delithiation (e.g., V, Cr), so that oxygen redox is not needed to achieve high capacity. Nevertheless, such constrains of metal species being in their 3+ states and having the capability of being oxidized to 5+ limit potential chemistries as oxyfluoride cathodes and result in low voltage of a battery. Here, the results showed that such constraints are not necessary. In fact, utilizing oxygen redox along with metal redox by judicious choice of metal combinations, which do not have to be in their 3+ states and do not need to have the capability of being oxidized to 5+ states, lead to not only higher voltage of a battery but also leads to more diverse chemistries to explore.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A lithium metal oxide suitable for use as a cathode material in a rechargeable battery, the lithium metal oxide having a general formula: $Li_xMn_z M'_{z'}O_uF_y$, with $1.80 \leq x \leq 2.20$, y=1, with $1.80 \leq u \leq 2.20$ and with $0.80 \leq y \leq 1.20$, and z equals one of either 1/2 or 2/3; the lithium metal oxide having a cation-disordered rocksalt structure, wherein M' is a transition metal selected from a second group consisting of Ti, Zr, Nb, Mo, Sn, Hf, Te, Sb, and combinations thereof; wherein Mn has a first oxidation state q and M' has a second oxidation state q', with $+2.7 \leq q/z)+(q'/z') \leq +3.3$, wherein a molar ratio between Li and the transition metals is $x/(z+z')=2.00\pm0.10$, and wherein a molar ratio between F and the oxygen is equal to $0.50\pm0.10$.

2. The lithium metal oxide of claim 1 having a cation-disordered rocksalt structure characterized by a crystallographic space group Fm-3m.

3. The lithium metal oxide of claim 1, wherein M' is Ti or Nb.

4. The lithium metal oxide of claim 3, having a formula of either $Li_2Mn_{1/2}Ti_{1/2}O_2F$ or $Li_2Mn_{2/3}Nb_{1/3}O_2F$.

5. A lithium metal oxide suitable for use as a cathode material in a rechargeable battery, the lithium metal oxide having a formula of one of either $Li_2Mn_{2/3}Nb_{1/3}O_uF_y$ or $Li_2Mn_{1/2}Ti_{1/2}O_uF_y$, wherein Mn has a first oxidation state q and Ti or Nb has a second oxidation state q', with $+2.7 \leq q/z)+(q'/z') \leq +3.3$ wherein a molar ratio between Li and the transition metals is $x/(z+z')=2.00\pm0.20$.

6. The lithium metal oxide of claim 1, wherein $(z+z')=1$.

7. The lithium metal oxide of claim 1, wherein x=2.0.

8. The lithium metal oxide of claim 1, wherein y=1.0.

9. The lithium metal oxide of claim 1, wherein u=2.0.

10. The lithium metal oxide of claim 1, wherein a theoretical metal-redox capacity is less than a lithium capacity.

11. A process for manufacturing a lithium metal oxide of claim 1, comprising:
   providing a lithium-based precursor;
   providing a first transition metal (Mn)-based precursor;
   providing a second transition metal (M')-based precursor;
   providing a fluorine-based precursor;
   stoichiometrically mixing the (Mn)-based, (M')-based and fluorine-based precursors to obtain a solid-phase mixture;
   adding the lithium-based precursor to the mixture so as to achieve a Li/(Mn+M'+F+O) molar ratio of $0.5\pm0.15$; and
   ball-milling the solid-phase mixture.

12. A positive electrode material, comprising a lithium metal oxide of claim 1.

13. A lithium-ion battery, comprising:
   a negative electrode material;
   an electrolyte; and
   the positive electrode material according to claim 1.

14. A portable electronic device, an automobile, or an energy storage system, comprising the lithium-ion battery of claim 13.

* * * * *

UNITED STATES PATENT AND TRADEMARK OFFICE
CERTIFICATE OF CORRECTION

PATENT NO. : 11,784,301 B2
APPLICATION NO. : 16/613731
DATED : October 10, 2023
INVENTOR(S) : Gerbrand Ceder and Jinhyuk Lee It is certified that error appears in the above-identified patent and that said Letters Patent is hereby corrected as shown below:

In the Claims

Column 7 Line 39 Claim 1:
"$1.80 \leq x \leq 2.20$, y=1, with $1.80 \leq u \leq 2.20$ and with $0.80 \leq y \leq 1.20$"
Should read:
--$1.80 \leq x \leq 2.20$ with $1.80 \leq u \leq 2.20$ and with $0.80 \leq y \leq 1.20$,--

Signed and Sealed this
Fourteenth Day of May, 2024

Katherine Kelly Vidal
*Director of the United States Patent and Trademark Office*